United States Patent
Hailston et al.

(10) Patent No.: US 8,042,829 B2
(45) Date of Patent: Oct. 25, 2011

(54) CART FOR LOADS

(75) Inventors: Bruce L. Hailston, Midland, MI (US); Nicholas J. Mehl, Essexville, MI (US)

(73) Assignee: Magline, Inc., Pinconning, MI (US)

(*) Notice: Subject to any disclaimer, the term of this patent is extended or adjusted under 35 U.S.C. 154(b) by 270 days.

(21) Appl. No.: 12/108,113

(22) Filed: Apr. 23, 2008

(65) Prior Publication Data

US 2008/0265538 A1 Oct. 30, 2008

Related U.S. Application Data

(60) Provisional application No. 60/913,588, filed on Apr. 24, 2007.

(51) Int. Cl.
*B62B 3/04* (2006.01)

(52) U.S. Cl. ............... 280/655.1; 280/35; 280/47.18; 280/47.27; 280/47.24; 280/47.371; 280/30

(58) Field of Classification Search ............ 280/651, 280/35, 47.18, 47.27, 47.28, 47.29, 655, 280/655.1, 638, 47.34, 47.2, 408, 416.1, 280/414.1, 460.1, 652, 79.11, 30, 47.13, 280/47.35, 43.12, 43.13
See application file for complete search history.

(56) References Cited

U.S. PATENT DOCUMENTS

| | | |
|---|---|---|
| 4,326,731 A | 4/1982 | Woychio et al. |
| 4,505,495 A | 3/1985 | Foss et al. |
| 5,040,809 A | 8/1991 | Yang |
| 5,228,716 A | 7/1993 | Dahl |
| 5,476,282 A | 12/1995 | Dahl |
| 5,484,150 A | 1/1996 | Yasutomi |
| 5,816,604 A * | 10/1998 | Hsieh et al. ............ 280/655.1 |
| 6,024,376 A * | 2/2000 | Golichowski et al. ..... 280/655.1 |
| 6,079,941 A * | 6/2000 | Lee ..................... 414/812 |
| 6,302,414 B1 * | 10/2001 | Berthiaume et al. ........ 280/47.18 |
| 6,488,304 B2 | 12/2002 | Krawczyk |
| 6,511,082 B2 | 1/2003 | Shirai |
| 7,055,847 B2 * | 6/2006 | Miller et al. ............ 280/638 |
| 7,198,283 B2 * | 4/2007 | Van Den Bosch et al. ... 280/504 |
| 2006/0103094 A1 * | 5/2006 | Wiff et al. .............. 280/79.11 |
| 2008/0197590 A1 * | 8/2008 | Tsai ..................... 280/47.18 |

FOREIGN PATENT DOCUMENTS

KR 1020060033890 4/2006

OTHER PUBLICATIONS

New Age Industrial (www.newageindustrial.com); Folding Utility Cart, 3 pages; Norton, Kansas.
Written Opinion & International Search Report for PCT/US08/61275 Aug. 25, 2008, 7 pages.

* cited by examiner

*Primary Examiner* — J. Allen Shriver, II
*Assistant Examiner* — Erez Gurari
(74) *Attorney, Agent, or Firm* — Varnum, Riddering, Schmidt & Howlett LLP

(57) ABSTRACT

A cart that can support and transport loads includes a platform, a number of wheels, a handle, and a wheel assembly. The wheels are mounted to the platform and can move the cart from place-to-place. The handle extends from the platform. And the wheel assembly extends from the platform and can move the cart from place-to-place when the cart is at an inclined position with respect to the ground upon which the cart is moved.

8 Claims, 6 Drawing Sheets

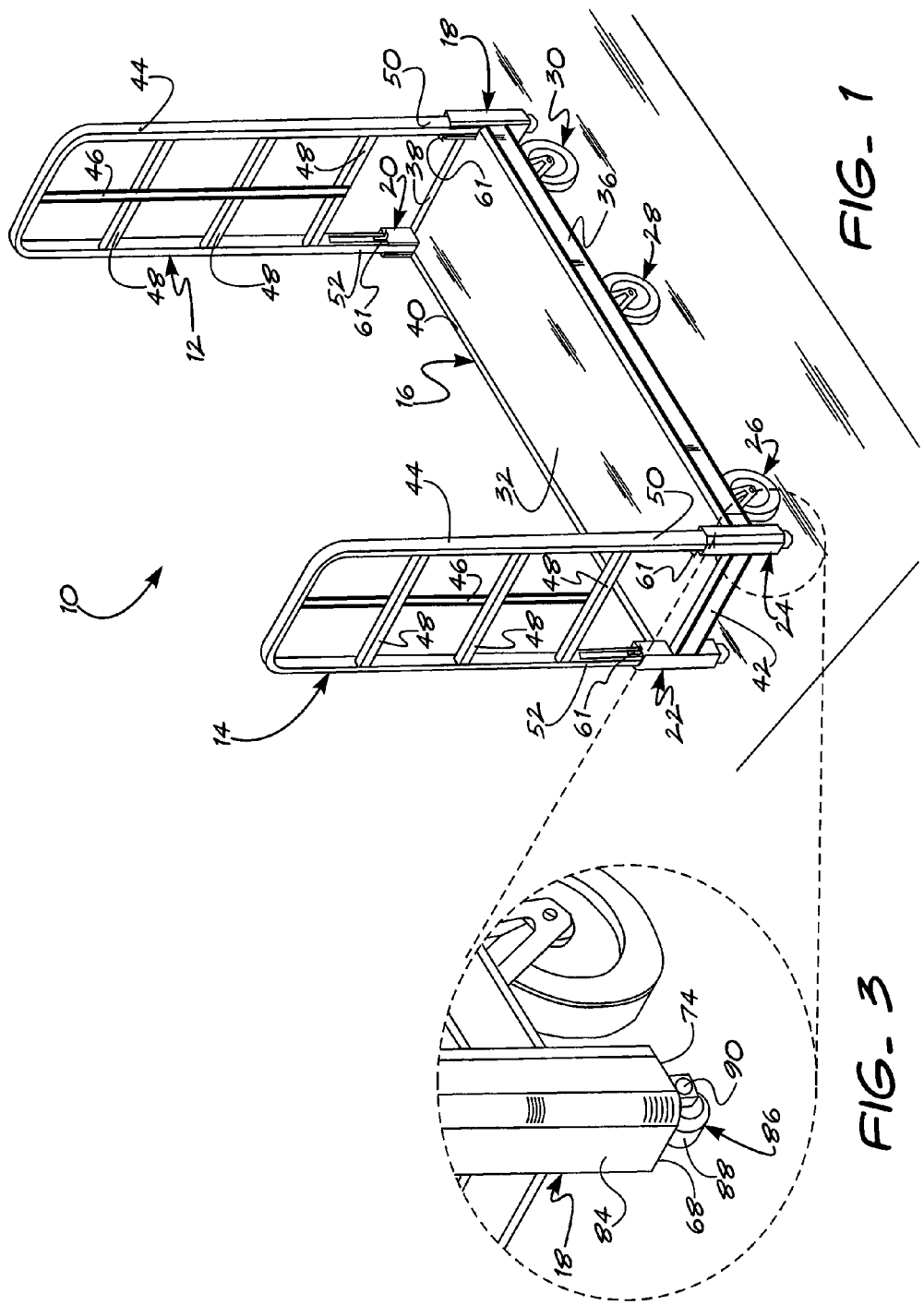

CART FOR LOADS

REFERENCE TO CO-PENDING APPLICATION

This application claims the benefit of, and incorporates by reference in its entirety, U.S. Provisional Application Ser. No. 60/913,588, filed Apr. 24, 2007.

FIELD OF THE INVENTION

The present invention relates generally to material handling, and more particularly to carts for supporting and transporting loads.

BACKGROUND OF THE INVENTION

Material handling structures such as carts are often used to support and transport loads like beverage containers, boxes, and the like. The carts are commonly equipped with one or more handles to help support the loads and, in some cases, for manually pushing and pulling the carts. After use, it may sometimes be desirable to store the carts.

SUMMARY OF THE INVENTION

One implementation of a presently preferred cart that can be used to support and transport loads may include a platform, more than one wheel, one or more handles, and one or more wheel assemblies. The wheel may be mounted to the platform in order to move the platform. The one or more handles may extend from the platform. And the one or more wheel assemblies may extend from the platform in order to move the cart at an inclined position with respect to the ground upon which the cart is moving.

Another implementation of a presently preferred cart that can be used to support and transport loads may include a platform, more than one wheel, a pair or more sockets, and one or more handles. The wheel may be mounted to the platform in order to move the cart. The sockets may be defined in the platform. And the handle may have a pair of legs with each leg having a pivotable free end that is received in the respective socket. The handle can collapse against the platform by folding or rotating the legs in its socket and about the pivotable free end.

Another implementation of a presently preferred cart can be used to support and transport loads. The cart may include a platform, more than one wheel, one or more pair of fixtures, and one or more handle. The wheel may be mounted to the platform in order to move the cart. The fixtures may extend from the platform and may each define a socket and a cutout. The cutout may be defined in a side of each of the fixtures. The handle may have a pair of legs with at least one of the legs being received in the respective socket when the handle is put in an uncollapsed position. And at least one of the legs may be received in the respective cutout tranversing, or crossing, the respective socket when the handle is put in a collapsed position.

BRIEF DESCRIPTION OF THE DRAWINGS

The following detailed description of preferred embodiments and best mode will be set forth with reference to the accompanying drawings, in which:

FIG. 1 is a perspective view of one embodiment of cart situated to accept loads;

FIG. 3 is an enlarged fragmentary view of one example of a wheel assembly that can be used with the cart of FIG. 1;

DETAILED DESCRIPTION OF PREFERRED EMBODIMENTS

Figure 4:
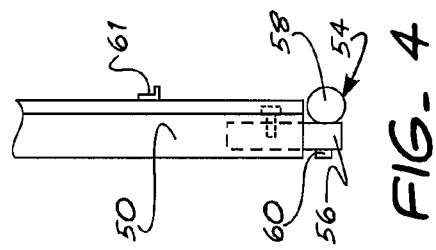
FIG. 4 is an enlarged fragmentary view of one example of a leg of a handle of the cart of FIG. 1.

Referring in more detail to the drawings, FIGS. 1-10 show several embodiments of a cart 10 with handles 12 and 14 that can collapse against a platform 16 and stack on top of one another when the cart 10 is not in use. Once the handles 12 and 14 are collapsed, the cart 10 can be stored in various positions including an upright position where the cart is stood tall on corner fixtures 18, 20, or 22, 24. A plurality of wheels 26, 28, and 30 may be mounted on the cart 10 for moving the cart from place-to-place. The various corner fixture embodiments described and their associated designs can be incorporated in different types of carts whether manually or power operated, including platform carts, hand trucks, or the like. Also, the term "collapse" and its various verb and adjective forms are used in a broad sense to describe the handles being folded, pivoted, or otherwise moved from an uncollapsed position and toward the platform; also describes the handles being laid, stacked, or tucked against or close to the platform, whether the handles remain connected to the cart at the respective corner fixtures or are completely removable out of the respective corner fixtures.

Referring to FIG. 1, the platform 16 may constitute the base of the cart 10 and is constructed to support and carry loads of various shapes and sizes. The platform 16 may have a generally rectangular shape and can be composed of any suitable material such as a metal like aluminum or steel, or a polymeric or composite plastic, or the like. The platform 16 may include a planar top surface 32 and side rails 36, 38, 40, and 42 that make up the perimeter of the platform 16. The wheels 26, 28, and 30 may be castor wheels, and there may be more or less of them than shown; for example, there may be six of them. The platform 16 could come in forms other than those shown including one with side rails defining a frame having a number of cross-bars extending therebetween to thus support and carry loads.

The handles 12 and 14 can serve as a side-support and guide for loads on the cart 10, and can be used for manually pushing and pulling the cart in the case of a manually operated cart. In the embodiment of FIGS. 1-6, the handles 12 and 14 are similar such that only one of them will be described. The handle 12 can be composed of any suitable material such as a metal like aluminum or steel, or a polymeric or a composite plastic, or the like. As shown, the handle 12 may be constructed of an extruded u-shaped frame 44 that may include a center bar 46, and cross-bars 48 transversing the center bar and connected to the frame. The bars may be connected such as by bolting, welding, or any other suitable way. The frame 44 may include a pair of legs 50, 52, each being constructed to mate in, or be inserted into, its respective corner fixture. The handles 12 and 14 may come in other forms including one with a solid frame, one with more or less bars, or the like. And although shown and described as having a pair of handles, the cart 10 could have one or more handles.

Referring to FIG. 4, in this embodiment each leg 50, 52 (only leg 50 shown) may be extruded to define an inner channel (not shown). The leg 50 may include a pivotable free end such as an end assembly 54 with a stem 56 that, as shown in phantom lines, may be inserted into the leg 50 and may be bolted to, or otherwise connected or carried by, the leg. The end assembly 54 may carry a ball 58 that may project from an inwardly facing surface of the stem 56. The ball 58 can be mounted to the stem 56 in any suitable way, such as by welding or by a bolt 60 fastened through the stem. Of course, the "ball" could be of any suitable construction, size, shape, or orientation, and need not be spherical or partially spherical. And the pivotable free end could be of any suitable construction, size, shape, or orientation about which the handles can pivot when collapsed. By way of another example, the ball could be a portion of round stock that may have a rounded end. In other embodiments, the end assembly 54 may carry a half ball with its flat surface mounted to the stem 56 and its balled surface projecting therefrom. Still in other embodiments, the stem 56 may have an integral balled or rounded end that itself constitutes the end assembly 54.

A stop 61 may be provided on a side of each leg 50, 52 to limit the downward insertion (i.e., direction of ground when handles uncollapsed and cart situated to accept loads) of the respective leg into its respective corner fixture. The stop 61 can be a projection extending from a side of the respective leg that checks the movement of the leg at the respective corner fixture. For example, as shown in FIG. 4, the stop 61 can be a metal L-shaped bracket that is bolted, welded, or otherwise connected to an inwardly facing surface of the leg 50.

Figure 5:
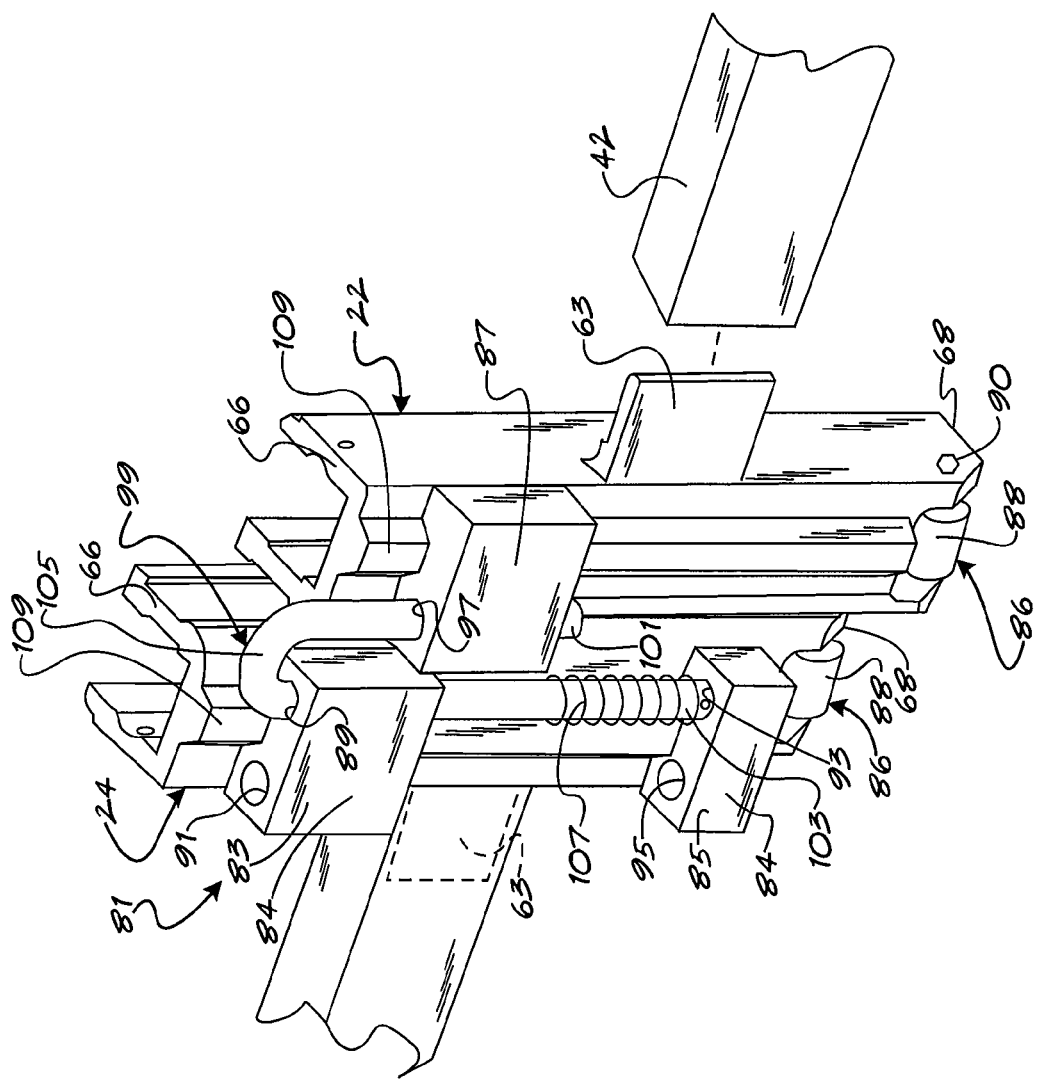
FIG. 5 is an enlarged fragmentary view of a coupler that can be used with the cart of FIG. 1.
Figure 6:
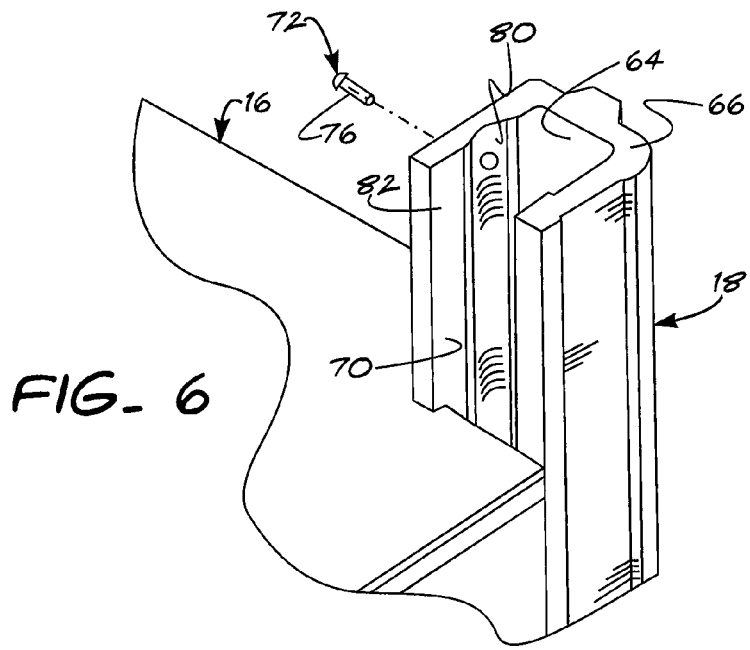
FIG. 6 is an enlarged fragmentary view of a socket of the cart of FIG. 1.

The corner fixtures 18, 20, 22, and 24 may be constructed to receive and hold the handles 12 and 14, permit collapsing of the handles, and provide wider feet or surfaces to support the cart when it is stood upright. As shown in FIG. 1, each fixture is located at, and can be welded integral with, a corner of the platform 16 between respective side rails; the fixtures need not necessarily be located at the corner of the platform, and instead could be located away from the corner such as along a side rail. Referring to FIG. 5, a first support 63 may project laterally from a side of each corner fixture (22, 24 shown), and a second support (not shown) may project laterally from another side of each corner fixture. Each support shoulders a respective side rail and can be attached—such as by bolting, welding, or the like—to the respective side rail. As shown, the first support 63 can be inserted inside of the side rail 42 when attaching the corner fixture 22 thereto. The corner fixtures can be extruded with a u-shaped cross-section, or otherwise constructed out of any suitable material such as a metal like aluminum or steel, or a polymeric or composite plastic, wood, or the like. Referring to FIG. 6, the corner fixture 18 defines a socket 64 that receives the leg and is bounded on three sides by walls of the corner fixture above the platform 16, and is bounded on all four sides by walls of the corner fixture below the platform.

Referring to FIGS. 3 and 6, the corner fixture 18 defines an open side or cutout 70 above the platform 16. Both a stop 72 and a stop 74 may be provided at or near respective upper and lower ends 66, 68 of the corner fixture 18. The stop 72 may prevent the leg from being completely pulled out of the corner fixture and can include, for example, a pin or bolt 76. In other embodiments, the stop 72 may not be included whereby the leg could be removed out of the corner fixture; and still in other embodiments, the stop 72 could include a ball and a detent or a pin and spring assembly fitted through an opening in the corner fixture with the pin normally biased to prevent the leg from being removed out of the corner fixture, and that can be retracted to allow complete removal of the leg. The stop 74, on the other hand, limits the downward insertion of the respective leg into the respective corner fixture. Although not specifically shown, the stop 74 may be a flat surface lying in a plane parallel with the platform 16. In other embodiments, the stop 74 could be located vertically lower or higher than the platform 16 so long as the corner fixtures brace the handles when pushing and pulling the cart 10, as in some cases. The stop 74 could also be similar to the various forms of the stop 72. The socket 64 can have a groove 80 indented in an inner surface 82 of the socket, the socket can extend from the upper end 66 to the lower end 68. The groove 80 can have an arcuate shape to receive the complementary shaped ball 58 such that the ball is retained in the groove when the handle is folded, as will be described.

In some instances, a plurality of adjacent or side-by-side carts 10 can be moved together or stored together, and a coupler 81 may be equipped on the carts to temporarily link, or otherwise hook-up, the side-by-side carts. The coupler 81 may be provided on each corner fixture, or could be provided at other locations including on the platform 16. The coupler 81 can come in various constructions and arrangements to optionally connect adjacent carts. The example shown in FIG. 5 may include a first block 83 and a second block 85 that are located on one cart at a corner fixture 24, and may include a third block 87 located on another cart at a corner fixture 22. The blocks may be attached to the respective corner fixture by bolting, welding, or any other suitable way. The first block 83 may define a first opening 89 and a second opening 91; the second block 85 may define a third opening 93 and a fourth opening 95 (which may not necessarily be needed but may be provided when the blocks are cut from the same stock); and the third block 87 may define a fifth opening 97. In some cases, the openings can be holes, slots, or voids of any suitable shape. A pin 99 can be slid (e.g., pushed and pulled) through the first hole 89 and the third hole 93. The pin 99 may be hook-shaped to have a first free or terminal end 101, a second free or terminal end 103, and a curved section 105 therebetween. A spring 107 may be attached at one end to the pin 99 and at another end to the second block 85 to bias the pin in the downward direction. This inhibits unintended decoupling of the carts.

When uncoupled, the pin 99 may be maintained adjacent to the corner fixture 24 with the first terminal end 101 inserted into the second hole 91. To couple carts, the first terminal end 101 can be pulled out of the second hole 91, the pin 99 rotated about the first hole 89, and the first terminal end then inserted into the fifth hole 97. To uncouple the carts, the first terminal end 101 can be pulled out of the fifth hole 97 and inserted back into the second hole 91.

Still referring to FIG. 5, a boss 109 may help index or key the respective block to its corner fixture, and set-off or help attach the block to the corner fixture. The boss 109 may be an elongated strip continuing vertically from the upper end 66 to the lower end 68 and may be located on each corner fixture.

Figure 2:
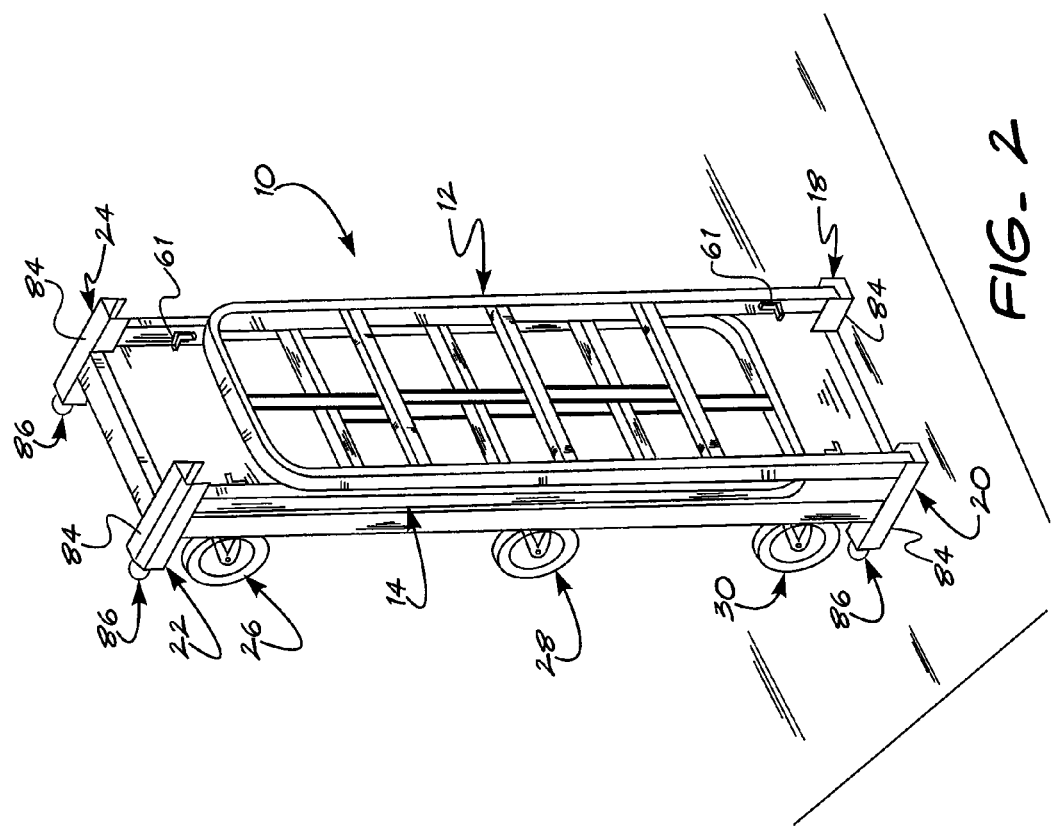
FIG. 2 is a perspective view of the cart of FIG. 1 situated upright with its handles collapsed for stowage.

Referring to FIGS. 2, 3, and 5, the cart 10 can be stood in an upright position on standing surfaces 84 for storing, and can be moved, such as by rolling, on two of its corner fixtures with optional wheel assemblies 86. The standing surfaces 84 may be defined by an outer planar wall of the corner fixture and can be used to balance the cart upright (FIG. 2), or even on a side (not shown). The standing surfaces 84 need not necessarily be a part of the corner fixtures, and instead can simply be a surface adjacent the corner fixtures that is sufficient for standing and balancing the cart 10. For example, in the case of the coupler 81, the outer surfaces of the blocks including the boss 109 may constitute the standing surfaces 84. The bosses 109 can provide a relatively smooth and planar standing surface compared other surfaces that may include weld beads or other disruptions.

The wheel assemblies 86 can be used to transport the cart 10 to a storage area, up a ramp, or to some other desired location. The wheel assemblies 86 can be equipped at or near the lower end 68 of one or more fixtures, and can be situated so that when the handles are uncollapsed and the cart 10 is in use, the wheel assemblies 86 are raised above and do not touch the ground below the cart 10. As one example, the wheel assemblies 86 can be located inboard the corner fixtures where they are not necessarily an integral part of the corner fixtures; and only a pair of wheel assemblies may be located at one end of the cart 10, without wheel assemblies at the other end, if desired.

Depending on the location of the wheels 26, 28, 30, and the location of the lower end 68 with respect to the ground, the wheel assemblies 86 may contact the ground at different angles with respect to the ground when the cart 10 is inclined toward its upright position. For example, the wheel assemblies 86 may contact the ground when the cart 10 is inclined between about 10° and 80°, with a presently preferred but not limiting range of 20° to 45°. In the embodiment of FIG. 3, the wheel assemblies 86 may include a wheel 88 that is forked to the lower end 68 and that rotates about an axle 90. In the embodiment of FIG. 5, the wheel 88 may be inset into the respective corner fixture whereby the axle 90 extends into or through the corner fixture. Of course, the wheel assemblies could be mounted or carried by the cart in other ways and locations; for example, the wheel assemblies could be mounted by a bracket on the side of the corner fixture or even to the platform 16.

When used to support and transport loads, the handles 12 and 14 can each be situated in their uncollapsed position so that they extend perpendicular to the platform 16 as best shown in FIG. 1. Here, the legs 50, 52 are mated within the respective corner fixture 18, 20, 22, and 24. The corner fixtures brace the legs 50, 52 in three directions, and the legs are braced in a fourth direction partly by the platform 16 and partly by the corner fixtures so that the handles can be pushed and pulled in all directions to move the cart 10 without giving way.

To collapse the handles, the handles can be lifted straight up within their sockets 64 (perpendicular to the platform 16) until the end assembly 54 is raised above the platform 16. Then, the handles can be rotated toward the platform 16. When rotated, the handles are folded through the cutouts 70 and down toward the platform 16 about a pivot defined at the balls 58. The socket 64 provides clearance for the stem 56 when the handles are being folded. One handle can be folded first to be almost flush against the platform 16, and the other handle can be folded on top of the first. In this position, the handles 12 and 14 are anchored in the respective socket 64 by the balls 58 being seated in their respective grooves 80. The legs 50, 52 are located in their respective cutouts 70 with a close-fit and limited side-to-side movement therein so that the ball 58 does not become unseated from the groove 80, while still permitting rotation of the legs in the sockets 64. This prevents the handles from being removed from or falling out of the fixtures. In another example without the stop 72 or with the stop moved or removed, the handles can be lifted completely out of the corner fixtures.

With or without the handles collapsed, the cart 10 can be inclined at one end and rolled to a desired location. For example, referring to FIG. 1, the end of the cart 10 with the handle 14 can be picked up to heel the cart on the wheel assemblies 86 below the handle 12. The cart 10 can then be wheeled around. To stand the cart 10 upright as shown in FIG. 2, the cart 10 is inclined further to about 90° with respect to the ground to prop the cart up on the standing surfaces 84 which may be at the respective corner fixtures.

Figure 7:
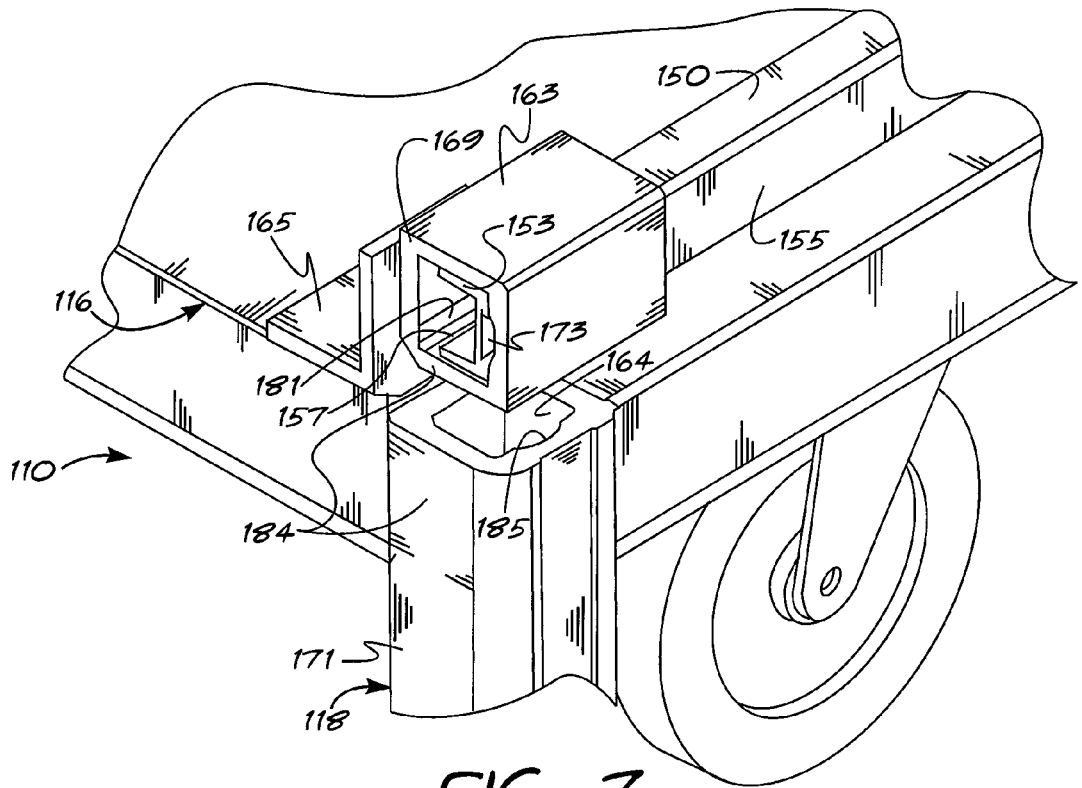
FIG. 7 is an enlarged fragmentary view of a corner fixture of another embodiment of a cart for supporting and transporting loads, showing a handle collapsed.
Figure 8:
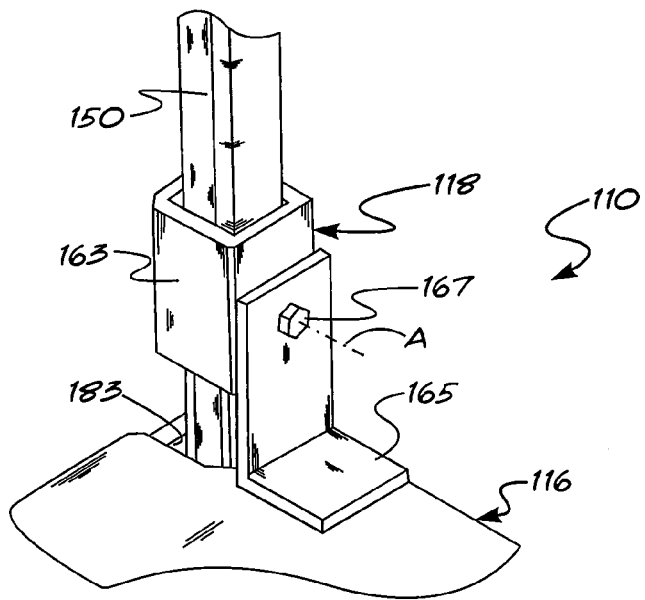
FIG. 8 is an enlarged fragmentary view of the corner fixture of FIG. 7, showing the handle uncollapsed.

Another embodiment of a cart 110 is shown in FIGS. 7 and 8 and may be similar in some respects to the embodiment of FIGS. 1-6, and the similarities generally will not be repeated. For example, a platform 116 and wheel assemblies in FIGS. 7 and 8 can be similar to those previously described.

The handles can also be similar in some respects to the ones previously described. As shown in FIG. 7, a stop 173 in the form of a tab can be located on a bottom surface 153 of the leg 150. If provided, the tab protrudes beyond an outer surface 155 of the leg 150 to prevent the leg from being removed out of a corner fixture 118 when the handle is lifted for collapsing; and if not provided, the leg 150 can be removed completely out of the corner fixture. In the side opposite the stop 173, a cutout 157 may be defined in the leg 150 and may extend above the bottom surface 153.

The corner fixture 118 may be constructed to receive and hold the handles, permit collapsing of the handles, and stand the cart upright. The corner fixture 118 may include a sleeve 163 connected to the platform 116 by an L-shaped bracket 165, and may also include a lower portion 171. The bracket 165 can be welded or otherwise attached to the platform 116 and attached to the sleeve 163 by a bolt 167 which permits rotation of the sleeve about a pivot axis A that is defined by the bolt. The sleeve 163 is hollow and sized to slidably receive the leg 150, and has a bottom surface 169 spaced from the lower portion 171. The lower portion 171 may also be hollow and sized to slidably receive the leg 150. As shown, the lower portion 171 can be extruded with a square-shape to form a one-piece structure. The lower portion 171 has a center axis that is aligned with a center axis of the sleeve 163 when the leg 150 is in the uncollapsed position. A stop (not shown) may be a flat surface lying in a plane parallel to the platform 116 to limit the insertion of the legs into the lower portion. In other embodiments, the stop could be located vertically lower or higher than the platform 116.

The sleeve 163 and the lower portion 171 define different sections of a socket 164. The socket 164 may include a first passage 181 in the sleeve 163, and a second passage 183 in the lower portion 171. The first passage 181 and the second passage 183 can have the same cross-sectional shape and size, in this case a square, to complement the leg 150. A groove 185 can be provided in the second passage 183 to give clearance for the stop 173. Outside of the socket 164, one side of the lower portion 171 and the bottom surface 169 of the sleeve 163 together may constitute a standing surface 184 for the cart to rest on while standing upright. The standing surface 184 defines an imaginary plane stretching between the side of the lower portion 171 and the bottom surface 169 to balance the upright cart.

When used to support and transport loads, the handles are each situated in an uncollapsed position and are standing erect as partially shown in FIG. 8. Here, the leg 150 is mated with the corner fixture 118. The leg 150 is inserted in the socket 164, through the first passage 181 and into the second passage 183. The lower portion 171 is preferably fixed to the platform 116 and braces the leg 150 against movement in all directions so that the cart 110 can effectively be moved by the handles.

As shown in FIG. 7, to collapse the handles, they can be lifted straight up until the bottom surface 153 is lifted out of and clears the lower portion 171 a sufficient distance to permit rotation of the sleeve 163 and the handle about the pivot A. The stop 173 prevents the leg from being withdrawn from the sleeve 163. Then, the sleeve 163 can be rotated about the pivot A toward the platform 116 to thus fold the handles toward the platform. Like the embodiment of FIGS. 1-6, this embodiment can be rolled to a desired location with its wheel assemblies and stood upright on the standing surface 184, or otherwise.

Figure 9:
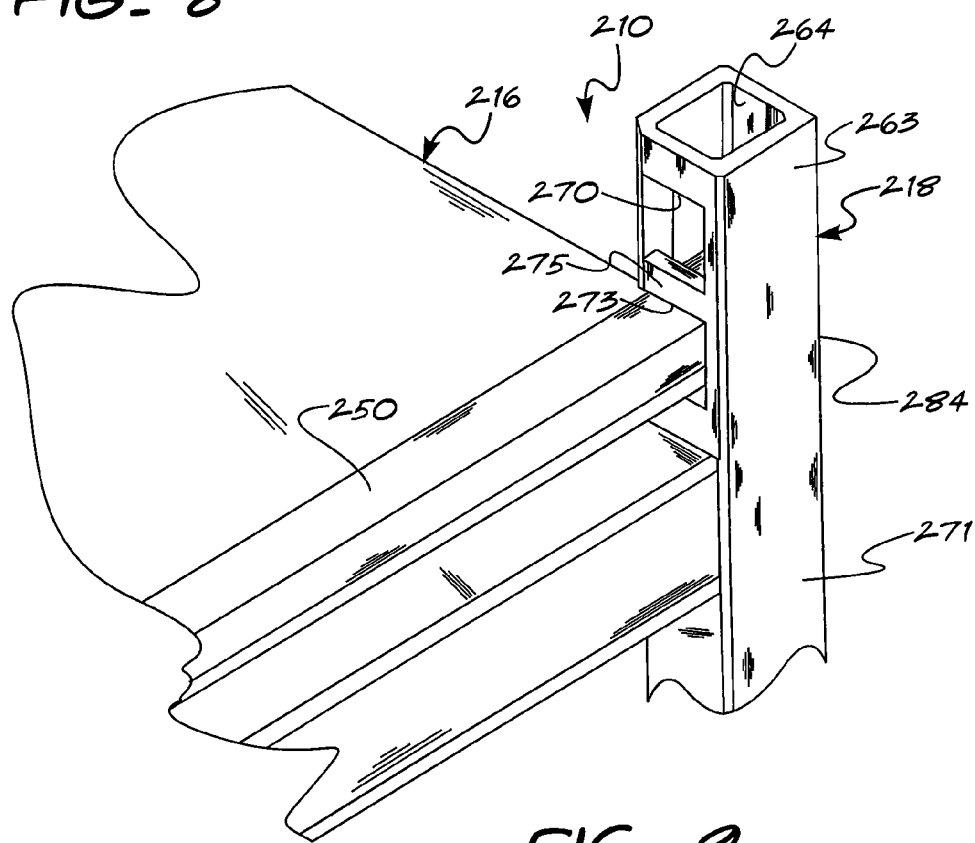
FIG. 9 is an enlarged fragmentary view of a corner fixture of another embodiment of a cart for supporting and transporting loads, showing a handle collapsed.
Figure 10:
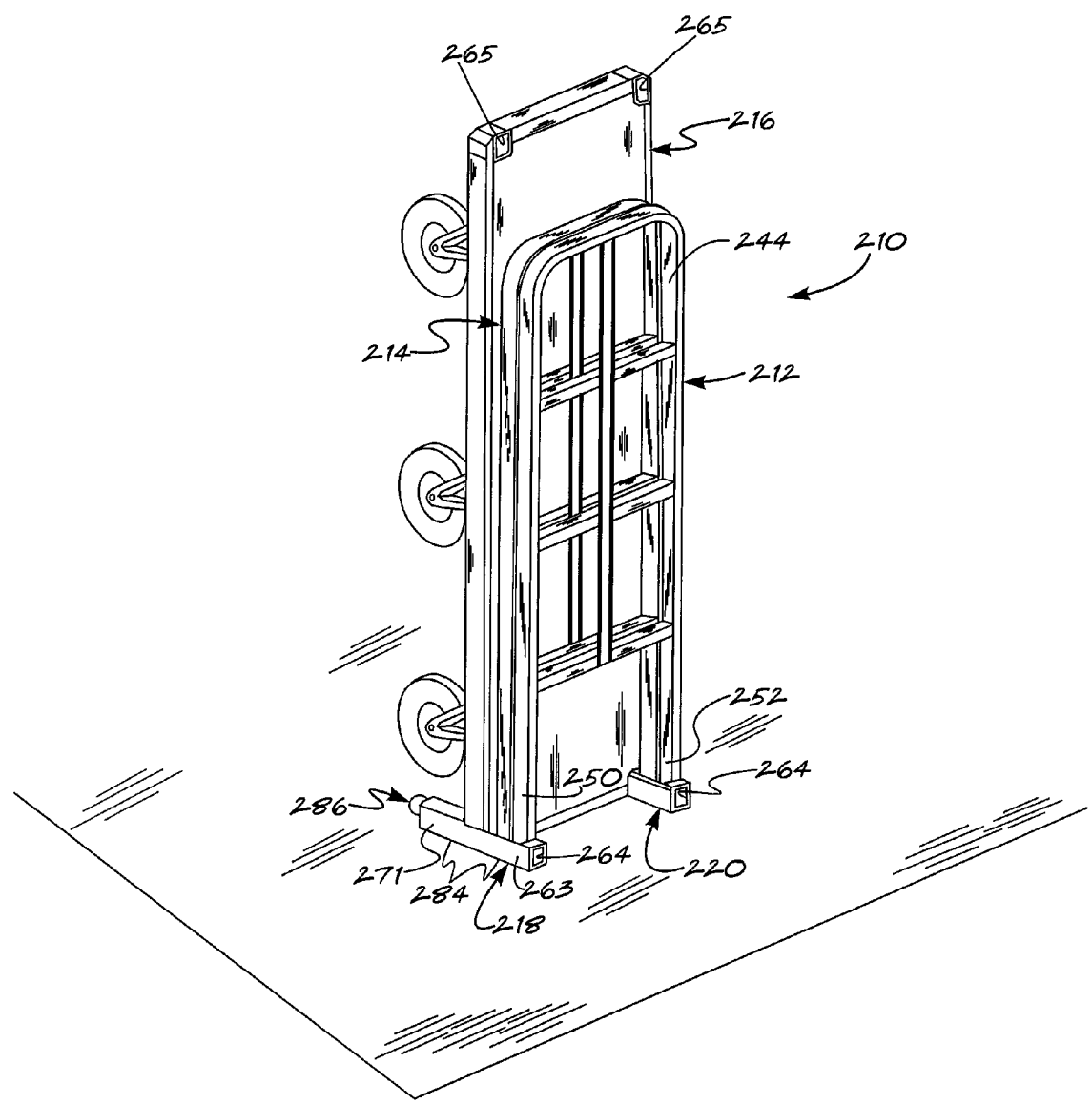
FIG. 10 is a perspective view of the cart of FIG. 9 situated upright with its handles collapsed for stowage.

Another embodiment of a cart 210 is shown in FIGS. 9 and 10 and may be similar in some respects to the embodiment of FIGS. 1-6, and the similarities generally will not be repeated. For example, a platform 216 and wheel assemblies 286 can be similar to those previously described.

Handles 212 and 214 can also be similar in some respects to the ones previously described. For example, a frame 244 on both handles can be constructed the same. In this embodiment, the legs 250 and 252 of each handle can be removed completely out of the corner fixtures.

In one embodiment, as shown in FIG. 10, one or more corner fixtures 218 and 220 may be provided at only one end of the cart 210, but of course one or more can be provided on the other side of the cart 210. The corner fixtures 218 and 220 may be constructed to receive and hold the handles 212 and 214, permit collapsing of the handles, and stand the cart 210 upright. Referring to FIG. 9, the corner fixture 218 may be extruded with a square-shape cross-section to form a one-piece structure including an upper portion 263 and a lower portion 271. The upper portion 263 can lie above the platform 216, and the lower portion 271 can lie below the platform 216. A stop (not shown) may be a flat surface lying parallel to the platform 216 to limit the insertion of the legs 250 and 252 into the lower portion. In other embodiments, the stop could be located vertically lower or higher than the platform 216. Sockets 265 at the other side of the cart 210 can also include a similar stop to similarly limit the legs insertion. In other embodiments, the legs themselves can be equipped with a stop on their outer surfaces so that the legs can be inserted in the sockets a certain distance and halted by the stop. The sockets 265 need not necessarily be located at the corners as shown, and instead can be located away from and inboard of the corners of the platform 216.

The upper portion 263 defines first and second cutouts 270 and 273 that each are sized and shaped to fit one leg, in this case shaped generally as a square. The cutouts 270 and 273 are cut into a side 275 of the upper portion 263 and are spaced apart so that the handles 212 and 214 can be stacked one on top of the other when they are collapsed, as shown in FIG. 10.

Each of the upper and lower portions defines a socket 264. The sockets 264 and 265 are sized to receive the legs 250 and 252 when the legs are inserted in them and together define one continuous and similarly sized socket. Outside of the socket 264, a side of both the upper portion 263 and the lower portion 271 constitute a standing surface 284 for the cart 210 to rest on while standing upright. The standing surface 284 defines an imaginary plane extending between the sides to balance the upright cart.

When used to support and transport loads, the handles 212 and 214 are each situated in an uncollapsed and erect position. The legs 250 and 252 of the handle 212 can be mated within the corner fixtures 218 and 220 and inserted longitudinally within each socket 264, while the legs of the handle 214 can be inserted in the sockets 265 opposite the corner fixtures. The legs of both handles are braced against movement in all directions by their respective corner fixtures and sockets so that the cart 210 can effectively be moved by the handles.

To collapse the handles, they can be lifted straight up and removed completely out of their respective corner fixtures or sockets. Referring to FIG. 9, once cleared of the upper portion 263, the leg 250 (and the other leg) can be inserted in the second cutout 273 and transversely through, and laterally with respect to, the socket 264 in the upper portion 263. The other handle can then be inserted the same way in the first cutout 270 so that the handles 212 and 214 are stacked one on top of the other. And like the embodiment of FIGS. 1-6, this embodiment can be rolled to a desired location with its wheel assemblies 286 and stood upright on the standing surface 284.

Though certain subject matter is shown and described with respect to certain embodiments, the subject matter of the different embodiments can be mixed and matched with each other. For example, the coupler 81 can be equipped with the cart 210, the stop 61 can be used with the cart 210, and so on. Moreover, subject matter that is described with a certain embodiment need not necessarily be present on that embodiment. For example, the handles of some embodiments need not be constructed as collapsible. Accordingly, subject matter is not limited by the embodiment in which it is shown and described.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A cart that supports and transports loads, comprising:
a platform;
a plurality of first wheels mounted to the platform for moving the cart;
a handle having a pair of spaced legs;
a pair of spaced fixtures at one end of said platform that each receive a leg of the handle;
each of said pair of fixtures defining socket, wherein each socket longitudinally receives a leg of the handle when the handle is in an erect position projecting upwardly from said socket and upwardly from said platform;
said handle being movable from said erect position to a collapsed position transverse of said socket;
wherein the handle includes a ball carried by at least one leg of the handle, the ball being received in a groove in the respective fixture and the handle pivoting about the ball when collapsed, wherein the ball has a diameter greater than that of the handle, and wherein the ball remains seated in the groove whether the handle is in the erect or collapsed position limiting the lateral motion of the handle.

2. The cart of claim 1, wherein each fixture further comprises a cutout to allow passage of the handle when the handle is collapsed.

3. The cart of claim 2, further comprising:
a secondary wheel mounted in and extending from each said fixture away from said handle, said secondary wheels being spaced above the floor when said first wheels are supporting said platform;
the back surface of each of said fixtures defining a cart supporting surface, such that when said handle is collapsed, said cart can be tipped on an end and supported on said cart supporting surfaces of said fixtures; and said secondary wheels projecting beyond said cart supporting surface, whereby said cart can be rotated off said cart supporting surfaces and onto said secondary wheels to facilitate transport of said cart in its collapsed position, at an inclined position with respect to the ground when the plurality of first wheels are not in contact with the ground.

4. A cart that supports and transports loads, comprising:
a platform;
a plurality of first wheels mounted to the platform for moving the cart;
a handle having a pair of spaced legs;
a pair of spaced fixtures at one end of said platform that each receive a leg of the handle;
each of said pair of fixtures defining socket, wherein each socket longitudinally receives a leg of the handle when the handle is in an erect position projecting upwardly from said socket and upwardly from said platform;
said handle being movable from said erect position to a collapsed position transverse of said socket;
wherein each of the fixtures further comprises a sleeve connected to the platform by a bracket and rotatable about the bracket, said rotatable sleeve being positioned above said socket, wherein each leg of the handle is received in both said socket and said sleeve when the handle is in its erect position, and wherein each leg of the handle is received in only said sleeve and rotated with the sleeve when the handle is moved to its collapsed position.

5. The cart of claim 4, further comprising:
A secondary wheel mounted in and extending from each said fixture away from said handle, said secondary wheels being spaced above the floor when said first wheels are supporting said platform;
The back surface of each of said fixtures defining a cart supporting surface, such that when said handle is collapsed, said cart can be tipped on end and supported on said cart supporting surfaces of said fixtures; and
The secondary wheels projecting beyond said cart supporting surface whereby the cart can be rotated off of the cart supporting surfaces and onto the secondary wheels to facilitate transport of the cart in its collapsed position, at an inclined position with respect to the ground when the plurality of first wheels are not in contact with the ground.

6. A cart that supports and transports loads, comprising:
a platform;
a plurality of first wheels mounted to the platform for moving the cart;
a handle having a pair of spaced legs;
a pair of spaced fixtures at one end of said platform that each receive a leg of the handle;
each of said pair of fixtures defining socket, wherein each socket longitudinally receives a leg of the handle when the handle is in an erect position projecting upwardly from said socket and upwardly from said platform;
said handle being movable from said erect position to a collapsed position transverse of said socket;
wherein each of said fixtures is located near or at a rear corner of said platform; a first one of said fixtures including a first block and the second one of said fixtures including a second block, each said first and second blocks including a pin receiving aperture, for receiving a leg of an inverted "U" shaped connector pin; whereby one leg of said inverted "U" shaped pin can be located in an aperture of a first block on one cart, and in a second block of another cart, to temporarily gang said carts together.

7. The cart of claim 6 wherein said pin is movably mounted in each said first blocks.

8. The cart of claim 6, further comprising:
A secondary wheel mounted in and extending from each fixture away from the handle, the secondary wheels being spaced above the floor when the first wheels are supporting the platform;
The back surface of each of the fixtures defining a cart supporting surface, such that when the handle is collapsed the cart can be tipped on an end and supported on the cart supporting surfaces of the fixtures; and
The secondary wheels projecting beyond the cart supporting surface, whereby the cart can be rotated off the cart supporting surfaces and onto the secondary wheels to facilitate transport of the cart in its collapsed position, at an inclined position with respect to the ground when the plurality of first wheels are not in contact with the ground.

* * * * *